Patented Nov. 27, 1934

1,982,604

UNITED STATES PATENT OFFICE 1,982,604

PROCESS FOR THE MANUFACTURE OF WHITE PIGMENT

Rudolf Barfuss, Uerdingen, Germany, assignor to I. G. Farbenindustrie Aktiengesellschaft, Frankfort-on-the-Main, Germany No Drawing. Application May 17, 1930, Serial No. 453,401. In Germany May 14, 1929

2 Claims. (Cl. 23—147)

The invention concerns the manufacture of white pigments of pronounced covering power by precipitation from zinc lyes and consists in incorporating with the zinc solution a soluble non-volatile alkaline reacting base in an amount such that the liquid above the precipitate exhibits a pH value between 12 and 12.8, filtering the precipitated product, washing and drying. The process can be carried out by adding to the zinc solution a quantity of alkali earth hydroxide less than that equivalent to the zinc present and subsequently adding caustic alkali lye until a pH value of more than 12 is attained.

The manufacture of zinc white according to the precipitation process presents several difficulties. The products obtainable by precipitating zinc lyes with bases possess in general no covering power; they glaze when rubbed with linseed oil, since the respective particle size differs considerably from the value most favorable for imparting covering power. The precipitation products are in general difficult to filter and moreover tend to form basic compounds, from which the acid residues cannot be removed even by continued washing. At increased temperatures hydrated zinc oxides produced by precipitation readily assume an irreversible yellow shade.

In accordance with the present invention these drawbacks are avoided and a zinc oxide or a hydrated zinc oxide suitable as a pigment is obtained in a simple manner from zinc lyes provided that the precipitation is effected in such a manner that a soluble non-volatile base, such as an alkali metal hydroxide or alkali earth metal hydroxide is added to the zinc solution at ordinary or elevated temperature in such an excess, that the liquid above the precipitate exhibits a pH value between 12.0 and 12.8. The hydrated zinc oxide thus precipitated settles well and can be washed readily. By subjecting it thereupon to drying and/or further reaching dehydration below incandescence temperature a pure white pigment of satisfactory covering power is obtained.

When employing an alkali earth metal hydroxide as the precipitating agent the process is with advantage carried out by adding a quantity of such an hydroxide slightly less than that equivalent to the zinc present, filtering and washing the precipitate, suspending it in water and then subsequently adding so much alkali lye that the optimum degree of alkalinity (pH between 12.0 and 12.8) is attained.

If the precipitation of zinc salt solutions is effected with such a quantity of an alkaline reacting agent that the final pH value of the solution is less than 12.0, a product of insufficient purity and covering power is obtained. If conversely more of the alkaline reacting agent is employed than corresponds to a final pH value of 12.8, the particles of the precipitate become too large, or a partial redissolution takes place.

The product obtained by my process has an average particle size of 0.7–1 micron and is distinguished from white zinc oxide pigments produced from zinc vapour at high temperatures by a characteristic yellow or brownish yellow luminescence in the ultra-violet light of a mercury vapour lamp.

If used as a white pigment in oil paints, the new product rapidly saponifies the linseed oil, forming zinc soaps which improve the qualities of the colour film.

The following examples will further illustrate the invention:

Example 1

To 100 litres of a 10 per cent zinc chloride solution is added slowly with thorough stirring at a temperature of 20° C. 6 per cent caustic soda lye in an amount that the solution in the precipitation vessel exhibits a pH value of 12.6. The precipitate is decanted, filtered, washed and dried at 100° C. It forms a white pigment of good covering power, containing 96 per cent of zinc oxide and 0.1 per cent of chlorine. The content of free alkali lies below 0.015 per cent.

Example 2

To 100 litres of a 10 per cent zinc chloride solution are added slowly with stirring 85 litres of 4 per cent milk of lime at room temperature and when the reaction is complete the precipitate is filtered and thoroughly washed. After again suspending it in water of room temperature caustic soda lye is added in an amount that the solution in the precipitation vessel attains a pH value of 12.6. The further treatment follows as in example 1 and yields a white pigment of good covering power and of similar properties and constitution.

I claim:
1. Process for the manufacture of a white pigment which consists in adding to a zinc chloride solution a non-volatile alkali metal hydroxide in such an amount that the final pH of the solution is between 12 and 12.8, filtering, washing and drying the precipitate.
2. Process for the manufacture of a white pigment which consists in adding to a zinc chloride solution a sodium hydroxide solution in such an amount that the final pH value of the solution is between 12.0 and 12.8, filtering, washing and drying the precipitate.

RUDOLF BARFUSS.